United States Patent

Murakami et al.

[11] Patent Number: 6,091,673
[45] Date of Patent: Jul. 18, 2000

[54] MAGNETO-OPTICAL HEAD

[75] Inventors: Yutaka Murakami, Hirakata; Osamu Mizuno, Osaka, both of Japan

[73] Assignee: Matsushita Electric Industrial Co., Ltd., Kadoma, Japan

[21] Appl. No.: 09/193,964

[22] Filed: Nov. 18, 1998

[30] Foreign Application Priority Data

Nov. 25, 1997 [JP] Japan .................................. 9-323055

[51] Int. Cl.⁷ .................................................. G11B 11/00
[52] U.S. Cl. ............................................. 369/13; 360/114
[58] Field of Search .............................. 369/13, 14, 110, 369/116; 360/114, 59; 365/122

[56] References Cited

U.S. PATENT DOCUMENTS

| | | | |
|---|---|---|---|
| 5,107,471 | 4/1992 | Miyake et al. | 369/13 |
| 5,168,484 | 12/1992 | Wachi et al. | 369/13 |
| 5,247,493 | 9/1993 | Kime et al. | 369/13 |
| 5,625,607 | 4/1997 | Chaya | 369/13 |

FOREIGN PATENT DOCUMENTS

| | | |
|---|---|---|
| 2-292756 | 12/1990 | Japan . |
| 6-139646 | 5/1994 | Japan . |

OTHER PUBLICATIONS

Patent Abstracts of Japan, Publication No. 06139646 A, published May 20, 1994.
Patent Abstracts of Japan, Publication No. 02292756 A, published Apr. 23, 1990.

*Primary Examiner*—Tan Dinh
*Attorney, Agent, or Firm*—Rosenthal & Osha LLP

[57] ABSTRACT

A magneto-optical head includes an optical head provided with a light-focusing device for focusing a beam spot on an information-recording medium and a magnetic head provided with a magnetic-field applying device for applying a magnetic field to the information-recording medium. The optical head and the magnetic head have the same rotation center and are arranged to rotate together in respective planes parallel to the information-recording medium.

The relative position shift between the beam spot and the magnetic-field applying device, which occurs when the beam spot follows eccentric components of the information-recording medium, is avoided. As a result, a magnetic-field applying device can be miniaturized, resulting in decrease in power consumption and in inductance of the magnetic head. Consequently, data can be recorded at a high frequency, thus improving the recording density and transfer speed.

14 Claims, 11 Drawing Sheets

MAGNETO-OPTICAL HEAD

FIELD OF THE INVENTION

The present invention relates to a magneto-optical head used in a magneto-optical recording and reproducing device, such as a mini disc player (MD) and a magneto-optical data file device, in which data is recorded on and reproduced from a magneto-optic disk by a magneto-optical system.

BACKGROUND OF THE INVENTION

Figure 8:
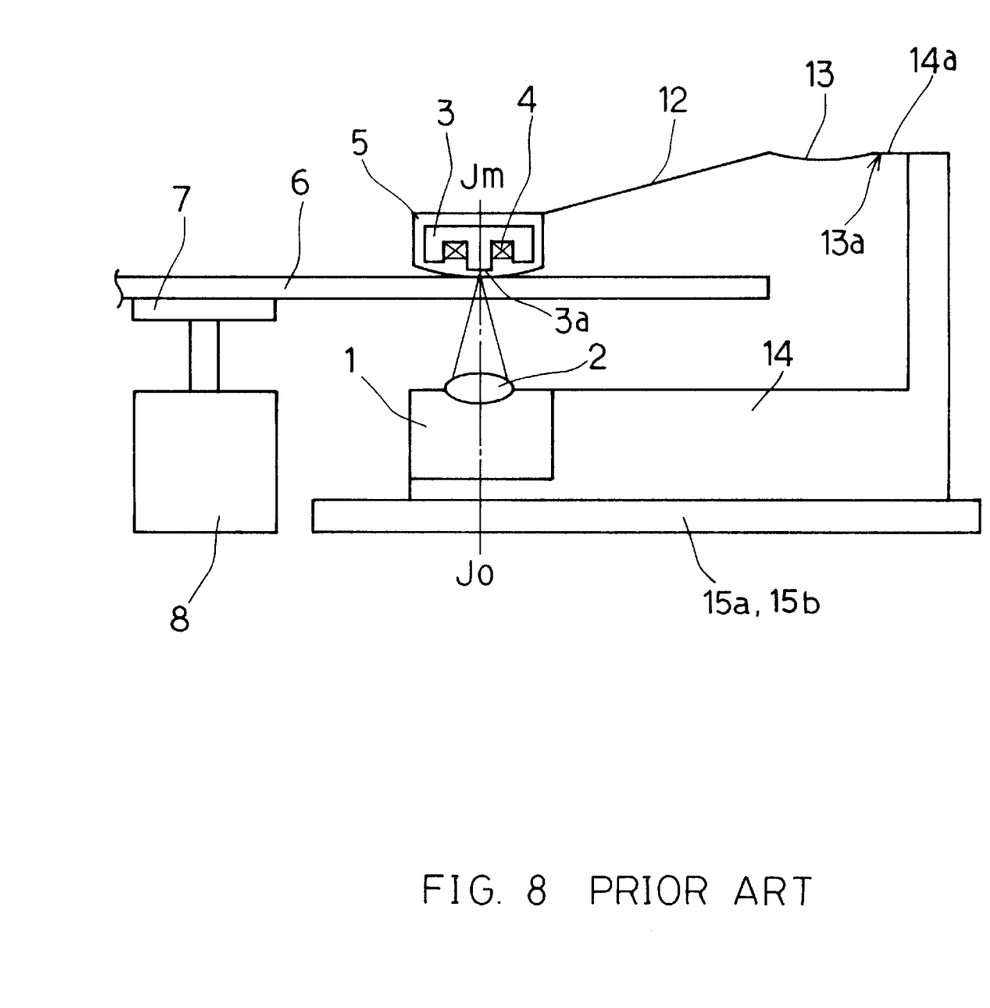
FIG. 8 is a side view showing a schematic view of an example of a conventional magneto-optical recording and reproducing device.
Figure 9:
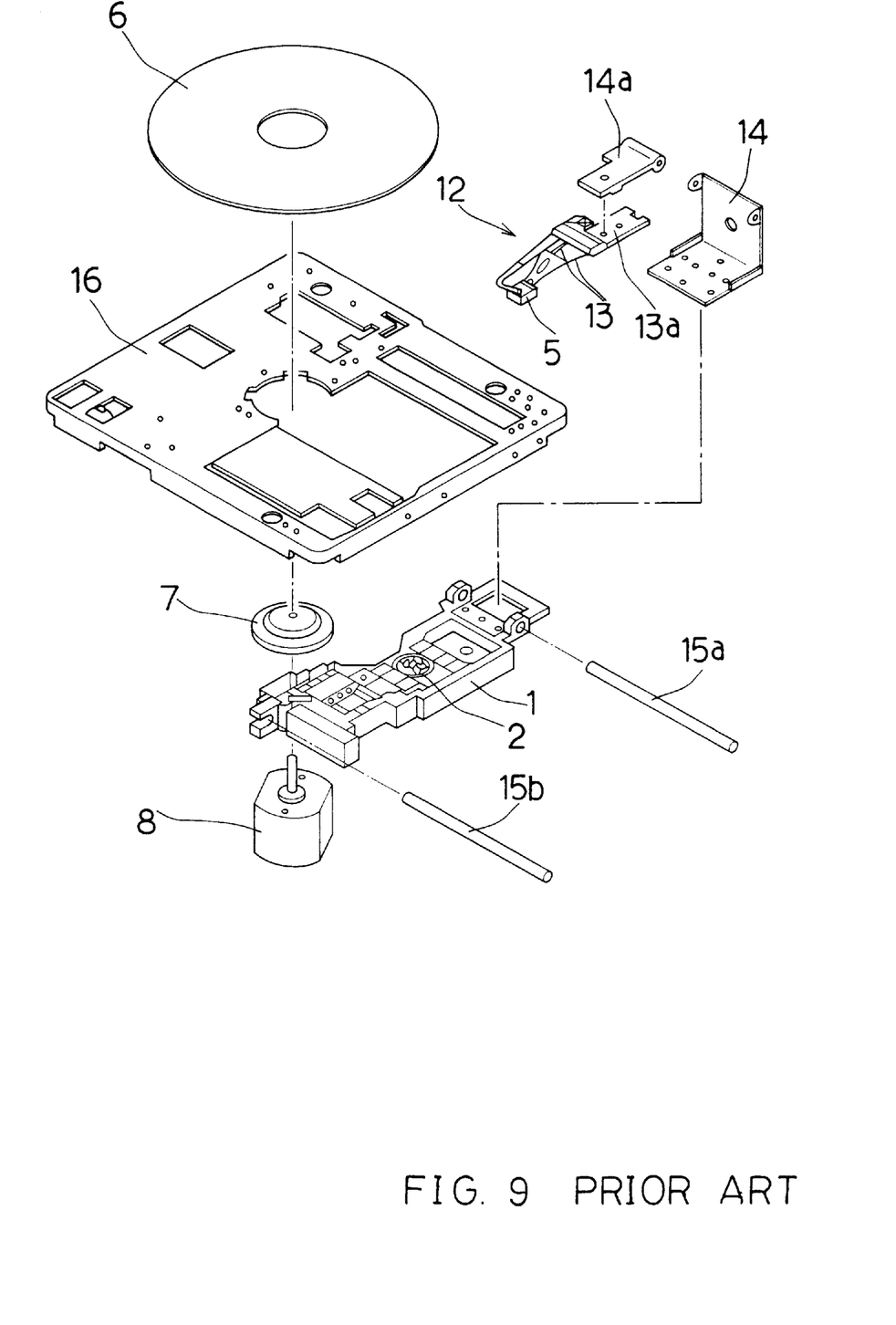
FIG. 9 is a schematic exploded view of an example of a conventional magneto-optical recording and reproducing device.

A magneto-optical recording and reproducing device, such as a mini disk player (MD) and a magneto-optical data file device, in which data is recorded by a magnetic-field modulation system has a configuration as shown in FIGS. 8 and 9. FIG. 8 is a schematic side view of a magneto-optical recording and reproducing device. FIG. 9 is a schematic exploded view of a magneto-optical recording and reproducing device.

In a magneto-optical disk 6 used as an information-recording medium, a semi-transparent magnetic film as a signal recording layer is formed on a transparent substrate. The magneto-optical disk 6 is held by a holder 7 provided at the end of a spindle motor 8. The spindle motor 8 drives and rotates the magneto-optical disk 6. A magnetic head 12 is held at the end of a suspension 13. An optical head 1 and a fixed end 13a of the suspension 13 are connected to each other by joint members 14 and 14a, thus constructing a magneto-optical head. The optical head 1 is attached to a lead screw 15a connected to a feed motor (not shown in the figure) using a gear, and to a guide axis 15b. The feed motor drives the optical head 1 and the magnetic head 12, thus moving the optical head 1 and the magnetic head 12 together in the radius direction of the magneto-optical disk 6.

In the magneto-optical recording and reproducing device employing a magnetic-field modulation system, when data is recorded on the magneto-optical disk 6, the optical head 1 irradiates a laser spot onto the signal recording layer of the magneto-optical disk 6 from one side with the magneto-optical disk 6 rotated by the spindle motor 8. Thus, a recording region on the signal recording layer is warmed at least to Curie temperature and the magnetic head 12 to which modulated magnetic-field data is provided applies an N or S magnetic field from the other side of the magneto-optical disk 6 according to the modulation signal. Thus, recording operation is performed.

In the magnetic head 12, a slider portion is made of resin. A slider 5 contacts and slides on a magneto-optical disk, for example, an MD. An E-shaped core 3 formed of a high permeability magnetic material (for example, a ferrite) is mounted to the end of the slider 5. As shown in FIG. 8, an open end of the core 3 faces to the bottom face of the slider 5. The center leg of the core 3 is wound with a coil 4. A current modulated according to an information signal is supplied to the coil 4, thus generating a perpendicular magnetic field directed from a pole end face 3a toward the magneto-optical disk 6.

However, the strength of a magnetic field generated from the pole end face 3a is sufficiently high and uniform only directly under the pole end face 3a. Therefore, it is necessary that an optical axis Jo of an laser beam emitted from the optical head 1 shown in FIG. 8 approximately coincides with a flux axis Jm of the magnetic head 12. If there is a discrepancy between the optical axis Jo and the flux axis Jm to a certain degree, a sufficient magnetic field cannot be applied to a recording region designated by the laser spot. As a result, excellent recording operation cannot be performed.

A well-known method of positioning an optical axis of a laser beam and a flux axis is described, for example, in Unexamined Japanese Patent Application Tokkai Hei 6-139646. A joint part and a positioning method in a conventional magneto-optical head will be described with reference to FIGS. 10 and 11 as follows.

Figure 10:
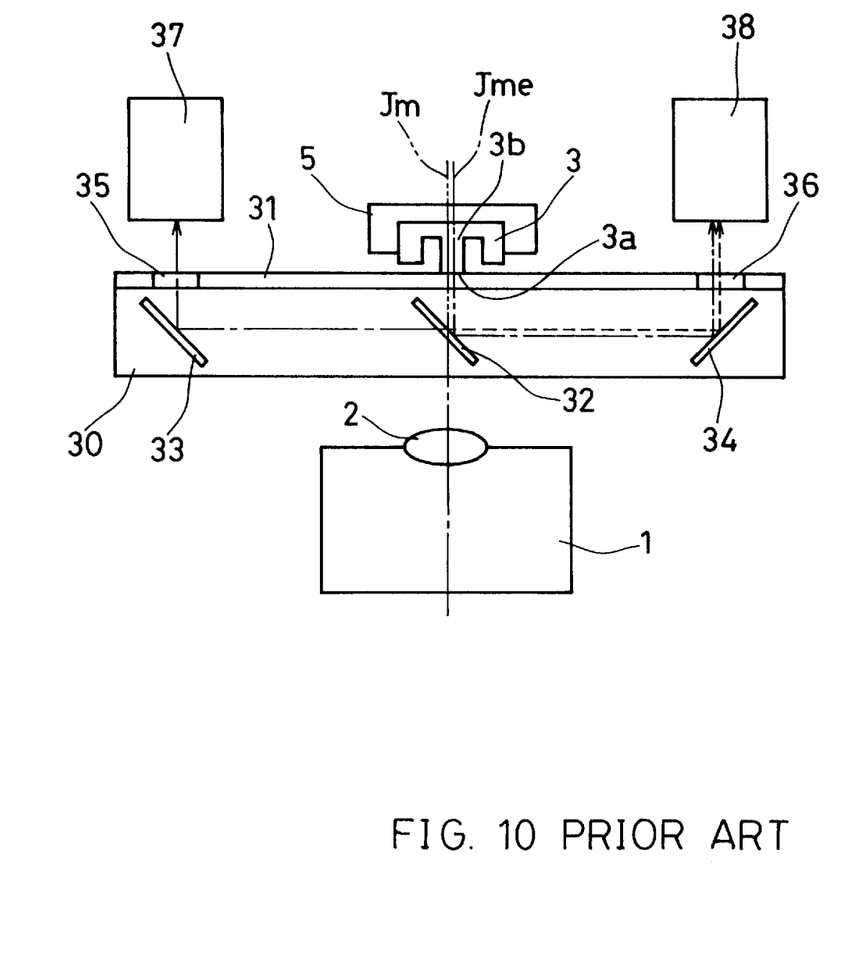
FIG. 10 is a view illustrating a conventional method of positioning an optical axis and a flux axis.

An observation jig 30 is provided with a reference plane 31 made of polycarbonate. The observation jig 30 is arranged so that a slider 5 and a core 3 of a magnetic head 12 are loaded on the reference plane 31. Inside the observation jig 30, a mirror 32 is arranged at an approximately intermediate position between the core 3 and an objective lens 2 that is a light-focusing means. The mirror 32 is located between mirrors 33 and 34. Additionally, observation parts 35 and 36 are provided. The observation part 35 is used for leading light reflected by the mirror 33. The observation part 36 is used for leading light reflected by the mirror 34.

In this configuration, when an optical head 1 emits a laser beam through the objective lens 2, the laser beam is reflected by the mirrors 32 and 33 and is lead to the observation part 35. On the other hand, an image of a pole end face 3a of a flux center of the core 3, that is, of a center core 3b of the E-shaped core 3 is reflected by the mirrors 32 and 34 and is lead to the observation part 36.

Cross hatching is provided at the observation parts 35 and 36 respectively so as to indicate a control point R that corresponds to the condition that an optical axis Jo of a laser beam coincides with a flux axis Jm from the pole end face 3a.

Figure 11:
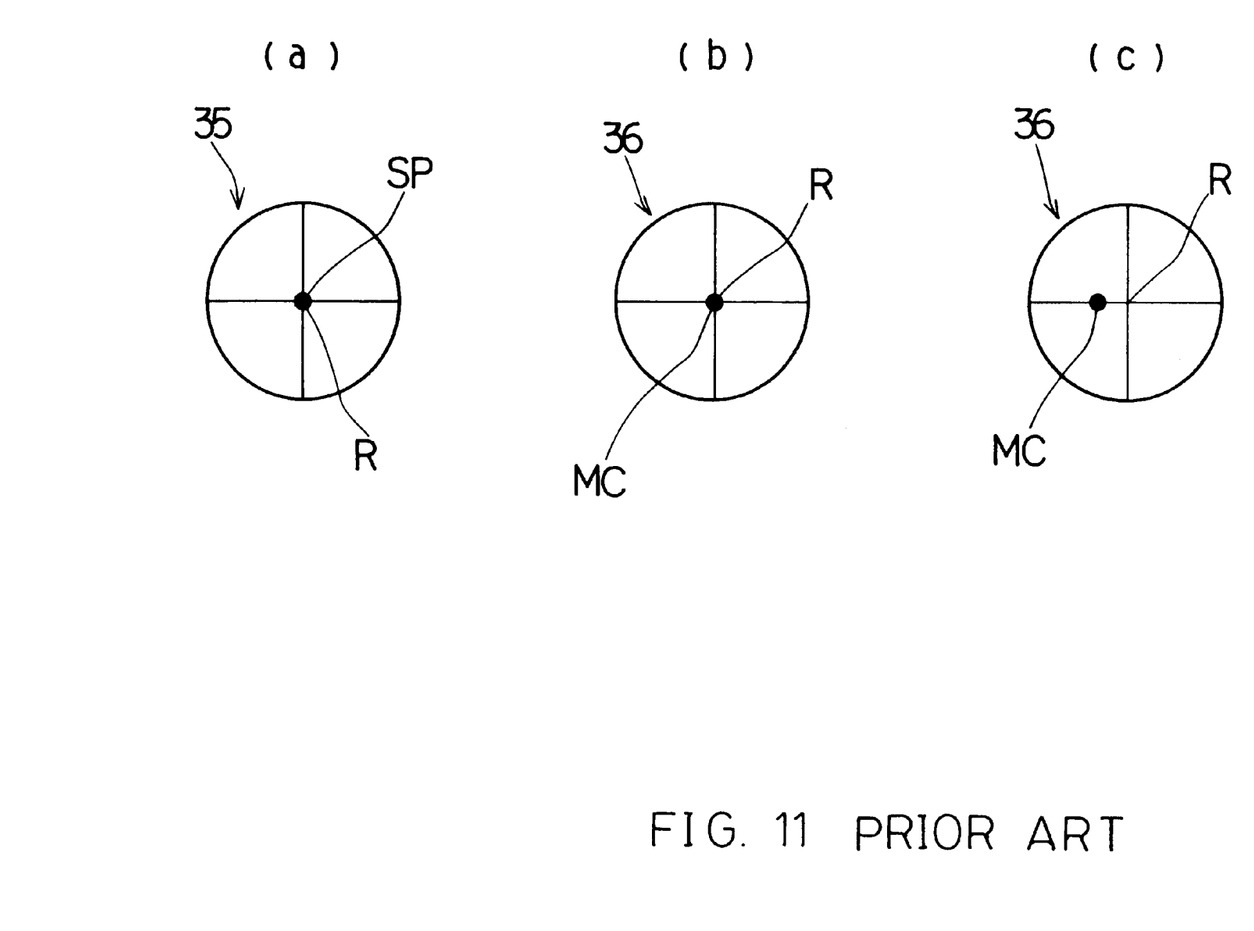
FIG. 11 also is a view illustrating a conventional method of positioning an optical axis and a flux axis.

Observation devices 37 and 38 comprised of a stereoscopic microscope are arranged above the observation parts 35 and 36, respectively. Suppose the pole end face 3a is slightly shifted relative to the optical axis Jo and therefore has a flux axis indicated by Jme when the observation jig 30 is positioned. In this case, when the position of the observation jig 30 is adjusted so that a laser spot SP coincides with the control point R at the observation part 35 as shown in FIG. 11(a), an image MC of the pole end face 3a observed at the other observation part 36 is shifted from the control point R as shown in FIG. 11(c). Therefore, by moving the magnetic head 12 according to such shift, each of the laser spot SP and the pole-end-face image MC is arranged so as to coincide with the control point R as shown in FIGS. 11(a) and (b).

A magneto-optical disk is rotated by a spindle motor and its eccentric components are acknowledged thereby. An optical head moves the objective lens in the radial direction so that a beam spot tracks an information track on the magneto-optical disk. Therefore, a magnetic field applied by the magnetic head is required in a wider region than that where the objective lens moves.

Recently, a magneto-optical recording and reproducing device has been improved remarkably in recording density. It has been required to increase the frequency for reversing the magnetic field in a magnetic head to a high frequency, i.e. from several MHz to around tens of MHz.

However, the magneto-optical head described above adjusts only the initial position relationship between the optical head 1 and the magnetic head 12. Therefore, it is necessary to increase the core size so as to be larger than a region where the objective lens moves. Consequently, the resistance value and the inductance of a coil wound around the center core increase, and the magnetic field modulation recording cannot be performed at a high frequency above several MHz.

SUMMARY OF THE INVENTION

An object of the present invention is to provide a magneto-optical head that enables magnetic field modulation recording at a high frequency.

In order to attain the object described above, a magneto-optical head according to a first configuration of the present invention comprises an optical head comprising light-focusing means for focusing a beam spot on an information-recording medium and a magnetic head comprising magnetic-field applying means for applying a magnetic field to the information-recording medium. The optical head and the magnetic head have the same rotation center and are arranged to rotate together in respective planes parallel to the information-recording medium.

According to the configuration described above, since the optical head and the magnetic head are arranged to rotate together in respective planes parallel to the information-recording medium, for example, the optical head and the magnetic head follow eccentric components of the information-recording medium while rotating together. Therefore, the relative position shift between a beam spot and the magnetic-field applying means, which, in the prior art, is caused by the beam spot following the eccentric components, does not occur. Thus, a magnetic-field applying means can be miniaturized, resulting in decrease in power consumption and in inductance of the magnetic head. Consequently, data can be recorded at a high frequency, thus improving the recording density and transfer speed.

In the configuration described above, it is preferable that the optical head and the magnetic head are arranged so as opposite each other and sandwich the information-recording medium. According to such a preferable configuration, a magneto-optical head with a simple configuration can be obtained.

Further, in the configuration described above, it is preferable that the light-focusing means and the magnetic head follow a primary component of the eccentricity of the information-recording medium together during rotation of the information-recording medium. According to such a preferable configuration, when a beam spot follows the primary component of the eccentricity, a relative position shift does not occur between the beam spot and the magnetic-field applying means.

It is preferable that the magneto-optical head described above further comprises a high-frequency tracking drive for driving the light-focusing means relative to the optical head in a plane parallel to the information-recording medium. According to such a preferable configuration, while the light-focusing means and the magnetic head follow the primary component of the eccentricity of the information-recording medium together during rotation of the information-recording medium, a beam spot can follow a high-frequency component of the eccentricity individually by using the high-frequency tracking drive. Thus, the tracking frequency of the light-focusing means for following the high-frequency component of the eccentricity can be increased, and therefore the transfer rate can be further increased.

Moreover, it is preferable that the magneto-optical head described above further comprises an optical block separated from the optical head comprising a light-emitting means and a light-receiving means. According to such a preferable configuration, the optical head part following the eccentricity of a magneto-optical disk can be lightened, thus improving driving sensitivity in the tracking direction.

In the preferable configuration described above, it is preferable that the magneto-optical head further comprises a mirror for refracting an optical beam emitted from the optical block to the optical head. Additionally, in this case, it is preferable that rotation of the mirror is synchronized with that of the optical head and the mirror rotates for an angle half the rotation angle of the optical head. It is also preferable that the mirror and the optical head rotate coaxially. According to such a preferable configuration, with a simple configuration an optical beam emitted from the separated optical block can be lead to the light-focusing means while following the rotation of the optical head.

A magneto-optical head according to a second configuration of the present invention comprises an optical head, an optical block, a high-frequency tracking drive, a mirror, and a magnetic head. The optical head comprises light-focusing means for focusing a beam spot on an information-recording medium. The optical block is separated from the optical head and comprises light-emitting means and light-receiving means. The high-frequency tracking drive drives the light-focusing means in a plane parallel to the information-recording medium relative to the optical head. The mirror refracts an optical beam emitted from the optical block. The magnetic head comprises magnetic-field applying means for applying a magnetic field to the information-recording medium. The optical head, the magnetic head, and the mirror have the same rotation center. The optical head and the magnetic head are arranged to rotate together in respective planes parallel to the information-recording medium.

According to the configuration described above, since the optical head and the magnetic head are arranged to rotate together in respective planes parallel to the information-recording medium, the optical head and the magnetic head can follow eccentric components of the information-recording medium while rotating together. Therefore, the relative position shift between a beam spot and the magnetic-field applying means, which is caused by the beam spot following the eccentric components, does not occur. Thus, the magnetic-field applying means can be miniaturized, resulting in decrease in power consumption and in inductance of the magnetic head. Consequently, data can be recorded at a high frequency, thus improving the recording density and transfer speed.

Since the high-frequency tracking drive for driving the light-focusing means in a plane parallel to the information-recording medium relative to the optical head is provided, while the light-focusing means and the magnetic head follow a primary component of the eccentricity of the information-recording medium together during rotation of the information-recording medium, a beam spot can follow a high-frequency component of the eccentricity individually by using the high-frequency tracking drive. Thus, the tracking frequency for following the high-frequency component of the eccentricity in the light-focusing means can be increased, and therefore the transfer rate can be further increased.

Moreover, since the optical block provided with at least a light-emitting means and a light-receiving means is separated from the optical head provided with the light-focusing means, the optical head part following the eccentricity of the magneto-optical disk can be lightened, thus improving driving sensitivity in the tracking direction. Additionally, since the mirror and the optical head rotate coaxially, an optical beam emitted from the separated optical block can be lead easily to the light-focusing means while following the rotation of the optical head.

In the first or second configuration described above, it is preferable that the light-focusing means and the magnetic head are separated mechanically at least when reproducing data from the information-recording medium. According to such a preferable configuration, the optical head can track individually when reproducing data. Thus, not only high-speed access can be realized when reproducing data, but also the electricity used for tracking control and access control can be decreased.

In the preferable configuration described above, it is preferable that the separating system comprises a clutch and mechanically separates and connects the optical head and the magnetic head. According to such a preferable configuration, the optical head and the magnetic head can be separated and connected reliably with a simple configuration.

Further, in the preferable configuration described above, it is preferable that the magneto-optical head further comprises a fixing system for fixing the magnetic head relative to a center of rotation when reproducing data from the information-recording medium. According to such a preferable configuration, the magnetic head can be fixed when the optical head is driven and tracks individually during reproducing data. Therefore, high-speed access in reproducing data can be realized more reliably and stably.

Moreover, in the preferable configuration described above, it is preferable that the optical head and the magnetic head are joined via a rotating system. In this case, by making the rotation center of the optical head and the magnetic head that are connected coincide with that of the rotating system, it is possible to rotate the optical head individually while fixing the magnetic head during reproducing data.

DETAILED DESCRIPTION OF THE INVENTION

Embodiments of the present invention will be described with reference to drawings as follows.

Embodiment 1

Figure 1:
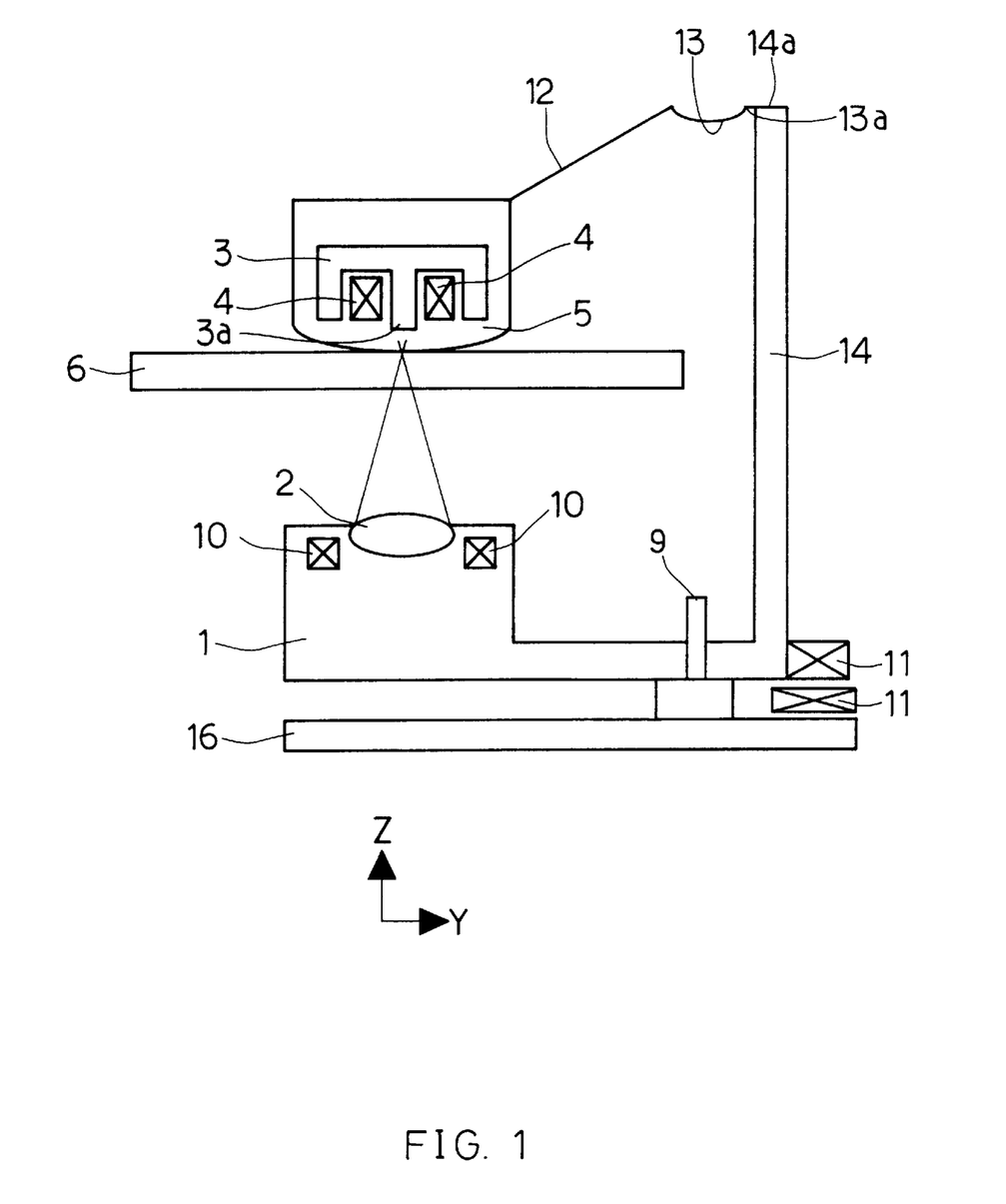
FIG. 1 is a side view showing a schematic view of a magneto-optical head according to Embodiment 1 of the present invention.
Figure 2:
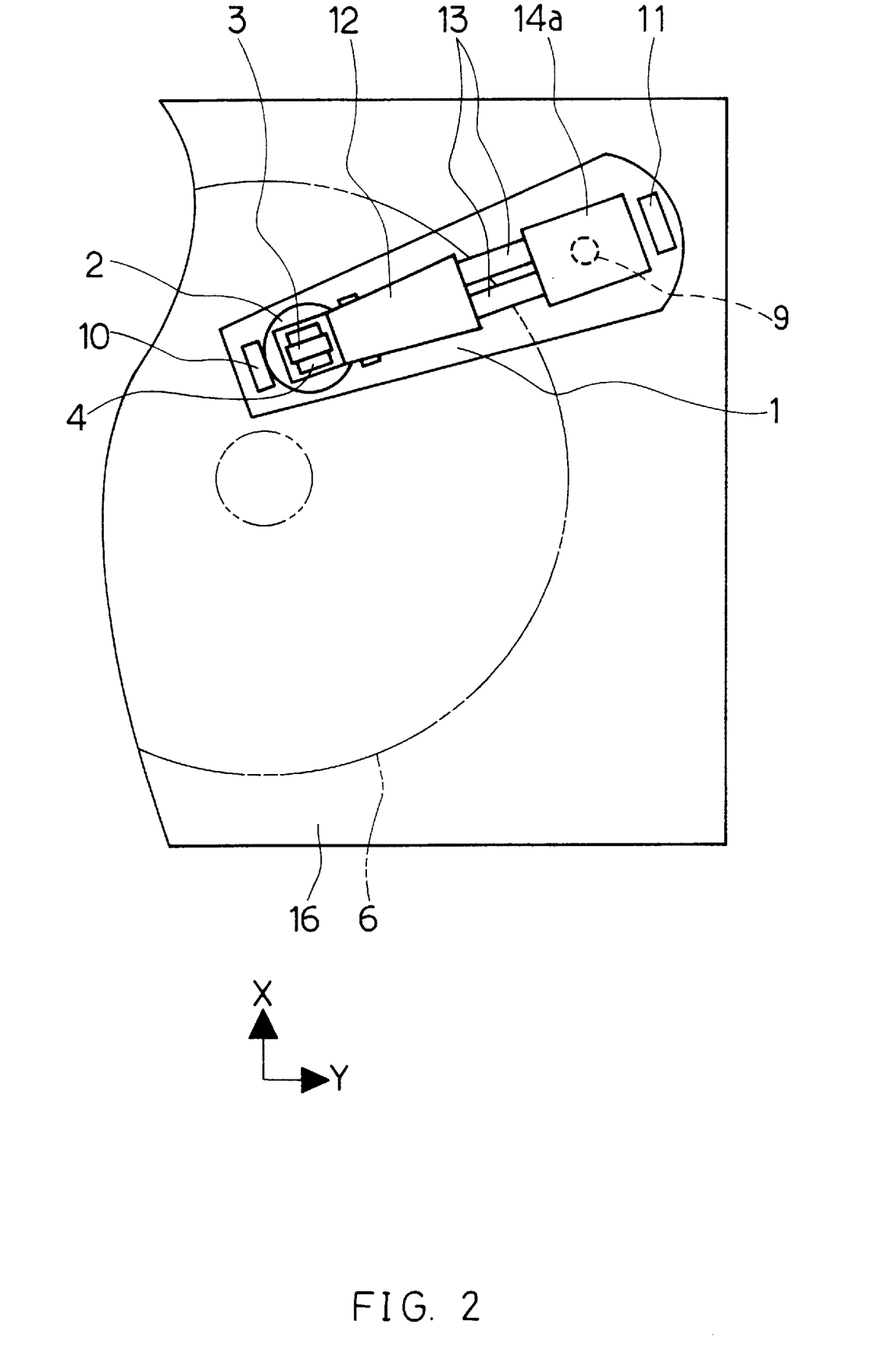
FIG. 2 is a top view showing a schematic view of a magneto-optical head according to Embodiment 1 of the present invention.

FIG. 1 is a side view of a magneto-optical head according to Embodiment 1 of the present invention. FIG. 2 is a top view of the magneto-optical head.

The constructional elements having the same function as in the prior arts shown in FIGS. 8, 9, 10, and 11 are indicated with the same reference characters.

In the magneto-optical head shown in FIGS. 1 and 2, an optical head 1 is provided with an objective lens 2 as a light-focusing means for focusing an optical beam emitted from a built-in semiconductor laser that is not shown in the figures. Focusing function of the objective lens 2 is controlled by an electromagnetic drive, for example, a focusing drive 10 composed of a coil and a magnet.

A magneto-optical disk 6 as an information-recording medium is made of transparent resins such as polycarbonate or polyolefine. A magnetic film is vapour-deposited on the opposite surface to the optical head 1 by spattering. As in FIGS. 8 and 9, the magneto-optical disk 6 is held by a holder 7 (not shown in the figures) and is rotated by a spindle motor 8 (not shown in the figures). A core 3 that is a magnetic-field applying means has an E-shape and is made of a soft magnetic material, such as a ferrite. A coil 4 is wound around the center pole of the core 3. A slider 5 is made of a resin having a high sliding ability such as liquid crystal polymer or PPS. The slider 5 has a hole formed near the center pole of the core 3 on the side facing the magneto-optical disk 6. Through this hole, a center pole end face 3a of the core 3 can been seen from the side of the optical head 1. A magnetic head 12 is constructed with the core 3, the coil 4, and the slider 5. The magnetic head 12 is fixed to the end of a suspension 13 and can follow the sway of the surface of the magneto-optical disk 6. The optical head 1 and the magnetic head 12 are positioned and are then connected by the joint members 14 and 14a.

A rotation axis 9 is provided on a base 16. The rotation axis 9 is inserted into a hole provided in the optical head 1. A tracking drive 11 is, for example, an electromagnet driving means comprising a coil and a magnet. The tracking drive 11 can rotate the optical head 1 and the magnetic head 12 together, with the rotation axis 9 as the center of rotation, thus performing tracking control.

The method of positioning the optical head 1 and the magnetic head 12 is the same as in the prior art shown in FIGS. 10 and 11. Therefore, the explanation of the method is omitted here.

Next, magneto-optical recording will be described.

In a magneto-optical recording and reproducing device employing the magnetic-field modulation system, when data is recorded on the magneto-optical disk 6, the optical head 1 irradiates a laser spot from one side onto a magnetic film that is a signal recording layer of the magneto-optical disk 6, with the magneto-optical disk 6 rotated by the spindle motor 8 shown in FIGS. 8 and 9. The focus control and the tracking control of the objective lens are performed by the focusing drive 10 and the tracking drive 11, so that the laser spot follows the eccentricity and the sway of the surface of the magneto-optical disk. While a recording region on the signal recording layer is warmed at least to Curie temperature by the laser beam, the magnetic head 12 in which modulated magnetic-field data is supplied to the coil 4 applies an N or S perpendicular magnetic field from the center pole of the core 3 from the other side of the magneto-optical disk 6 according to a modulation signal, thus performing recording operation.

In this case, the optical head 1 and the magnetic head 12 are connected with a joint member 14. Therefore, the magnetic head 12 also rotates, with the rotation axis 9 as the center of rotation. Thus, an optical axis Jo and a center axis Jm of the pole end face 3a of the core 3, which are adjusted by the positioning method shown in the prior art of FIGS. 10 and 11, always coincide.

As described above, the magneto-optical head according to the present embodiment comprises the optical head provided with the objective lens as a light-focusing means and the magnetic head provided with the magnetic-field applying means. The objective lens focuses a beam spot on the magneto-optical disk that is an information-recording medium. The magnetic-field applying means applies a magnetic field to the information-recording medium. The optical head and the magnetic head rotate together in respective planes parallel to the information-recording medium. Therefore, the position shift between the beam spot and the magnetic-field applying means, which is caused by the beam spot following the eccentricity of the magneto-optical disk, does not occur. As a result, the magnetic-field applying means can be miniaturized, resulting in decrease in power consumption and in inductance of the magnetic head. Consequently, data can be recorded at a high frequency, thus improving the recording density and speed for transferring the information signal.

Embodiment 2

Figure 3:
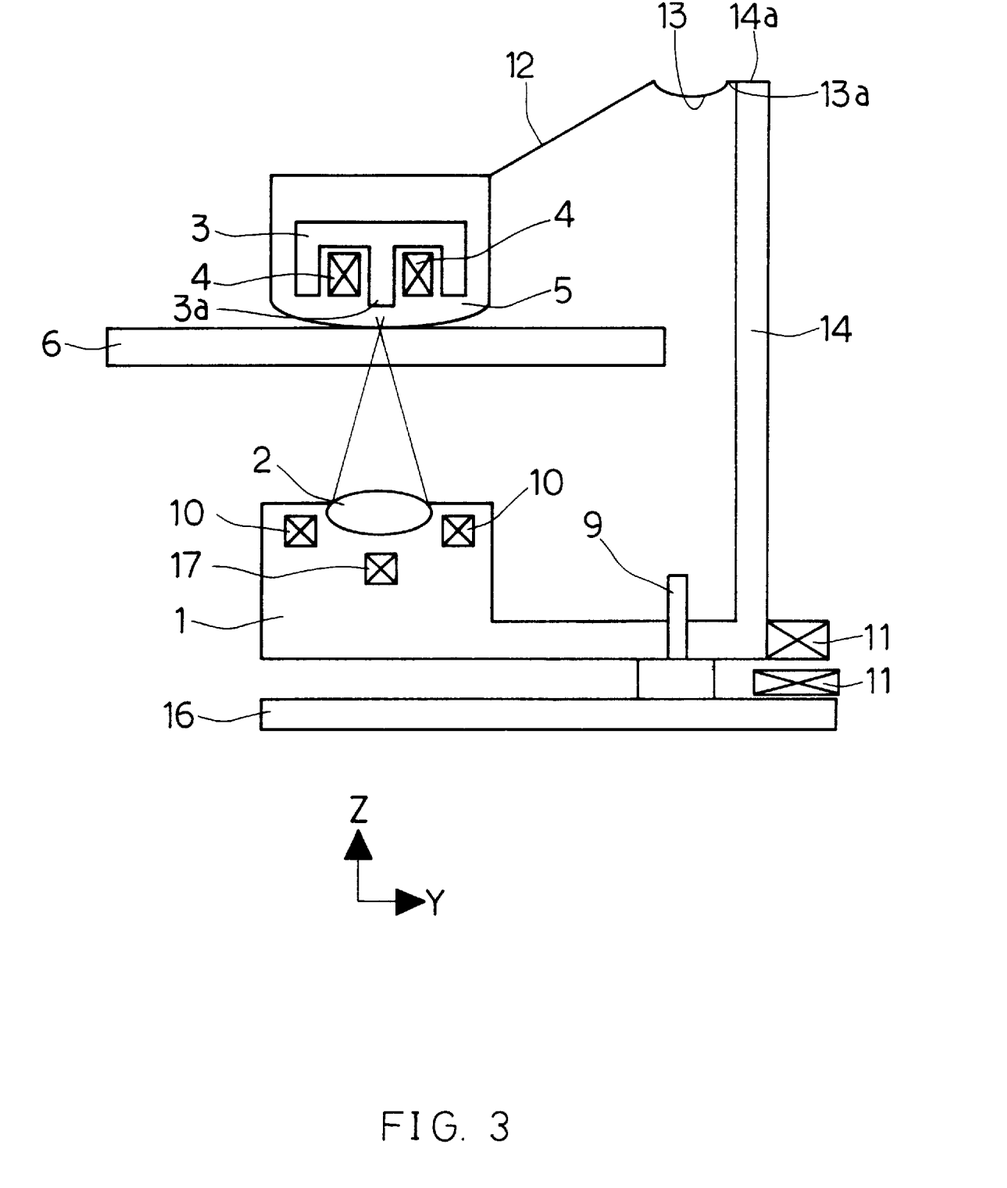
FIG. 3 is a side view showing a schematic view of a magneto-optical head according to Embodiment 2 of the present invention.
Figure 4:
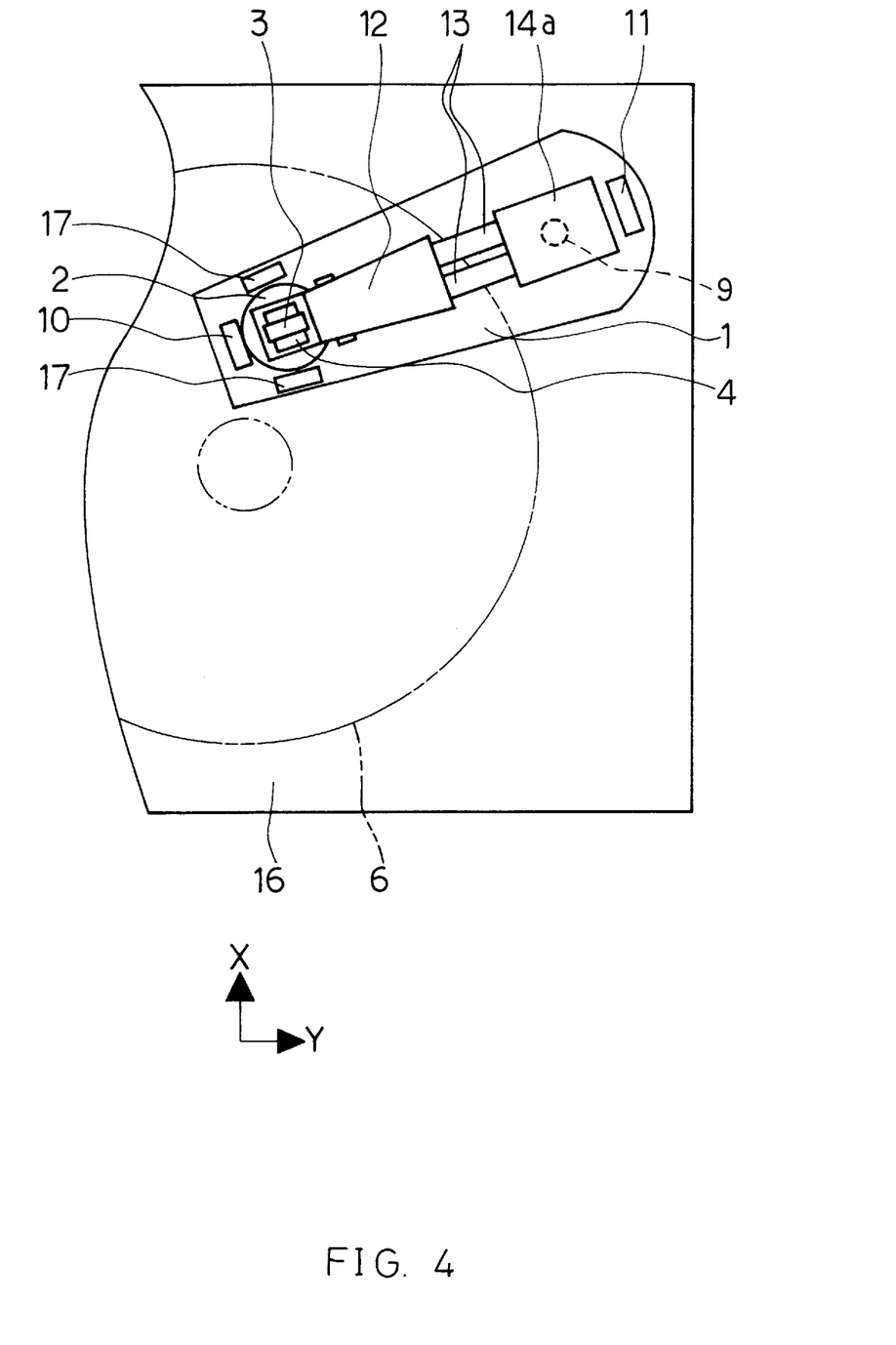
FIG. 4 is a top view showing a schematic view of a magneto-optical head according to Embodiment 3 of the present invention.

FIG. 3 is a side view of a magneto-optical head in Embodiment 2 of the present invention. FIG. 4 is a top view of a magneto-optical head in Embodiment 2 of the present invention.

The constructional elements having the same function as in the prior arts shown in FIGS. 8, 9, 10, and 11 are indicated with the same reference characters.

In FIGS. 3 and 4, a high-frequency tracking drive 17 is, for example, an electromagnet drive comprising a coil and a magnet.

The example shown in FIGS. 3 and 4 differs from the prior art shown in FIGS. 8, 9, 10, and 11 and the example shown in FIGS. 1 and 2 in the following point. The eccentric components of a rotating magneto-optical disk 6 are divided into a primary component having a period equal to or shorter than a rotation period of the disk 6 and a high-frequency eccentric component having a period longer than the rotation period. By driving an optical head 1 comprising an objective lens 2 as a light-focusing means and a magnetic head 12 together using a tracking drive 11, the primary component is followed by a laser spot. By driving the objective lens 2 individually in a plane parallel to the information-recording medium 6 relative to the optical head 1 using the high-frequency tracking drive 17, the high-frequency eccentric component is followed by a laser spot.

The method of positioning the optical head 1 and the magnetic head 12 is the same as in the prior art. Therefore, the explanation of the method is omitted here.

As described above, the magneto-optical head according to the present embodiment comprises the tracking drive for driving the optical head and the magnetic head in respective planes parallel to the information-recording medium and the high-frequency tracking drive for driving the light-focusing means slightly in a plane parallel to the information-recording medium. In the magneto-optical head, the light-focusing means and the magnetic head follow the primary component of the eccentricity of the information-recording medium together during rotation of the information-recording medium. Consequently, high tracking frequency of the light-focusing means can be obtained, thus increasing the transfer rate in addition to the effect of the first embodiment. Moreover, since the magnitude of the high-frequency component of the eccentricity is extremely smaller than that of the primary component of the eccentricity, it is almost not necessary to enlarge the core corresponding to the displacement magnitude of the light-focusing means by the high-frequency tracking drive 17.

Embodiment 3

Figure 5:
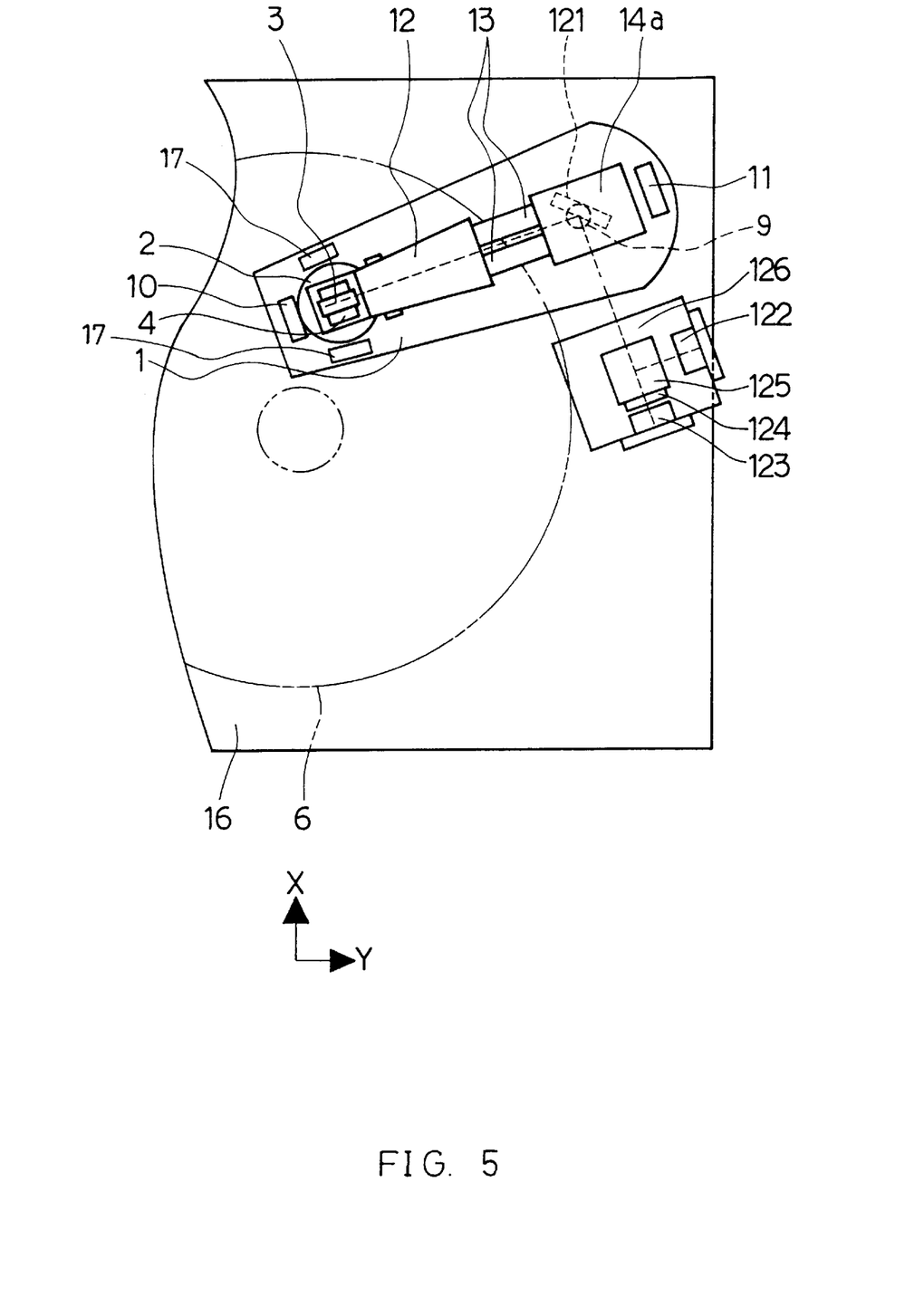
FIG. 5 is a top view showing a schematic view of another example of a magneto-optical head according to Embodiment 3 of the present invention.

FIG. 5 is a top view of a magneto-optical head according to an embodiment 3 of the present invention.

The constructional elements having the same function as in the prior arts shown in FIGS. 8, 9, 10, and 11 are indicated with the same reference characters.

The example shown in FIG. 5 differs from the prior art shown in FIGS. 8, 9, 10, and 11 and the examples shown in FIGS. 1, 2, 3, and 4 in the following point. As shown in FIG. 5, a mirror 121 is provided near a rotation axis, and an optical block 126 is separately provided and is fixed onto a base 16. The optical block 126 comprises a semiconductor laser 122 that is a photodetector, a half mirror prism 125, a polarization-separating element 124, and a photodetector 123. The polarization-separating element 124 separates P-polarization and S-polarization that are magneto-optical signals from light reflected from a magneto-optical disk 6. The mirror 121 is inserted, for example, into a rotation axis 9 moveably and is joined to an optical head 1 with a reduction gear (not shown in the figure). When the optical head 1 rotates, the mirror 121 rotates for an angle half the rotating angle of the optical head 1, with the rotation axis 9 as the center of rotation. Consequently, a laser beam emitted from the semiconductor laser 122 always enters into an objective lens 2.

The method of positioning the optical head 1 and the magnetic head 12 is the same as in the prior art. Therefore, the explanation of the method is omitted here.

As described above, the magneto-optical head according to the present embodiment comprises at least the optical head, the optical block, the high-frequency tracking drive, the mirror, and the magnetic head. The optical head is provided with a light-focusing means for focusing a beam spot on an information-recording medium. The optical block is separated from the optical head and is provided with at least an emission means and a light-receiving means. The high-frequency tracking drive drives the light-focusing means in a plane parallel to the information-recording medium relative to the optical head. The mirror refracts an optical beam emitted from the optical block. The magnetic head is provided with a magnetic-field applying means for applying a magnetic field to the information-recording medium. The optical head, the magnetic head and the mirror have the same rotation axis, and the optical head and the magnetic head rotate together in respective planes parallel to the information-recording medium. Consequently, besides the effects of the embodiments 1 and 2, the magneto-optical head portion following the eccentricity of the magneto-optical disk can be lightened, thus improving driving sensitivity in the tracking direction.

Embodiment 4

Figure 6:
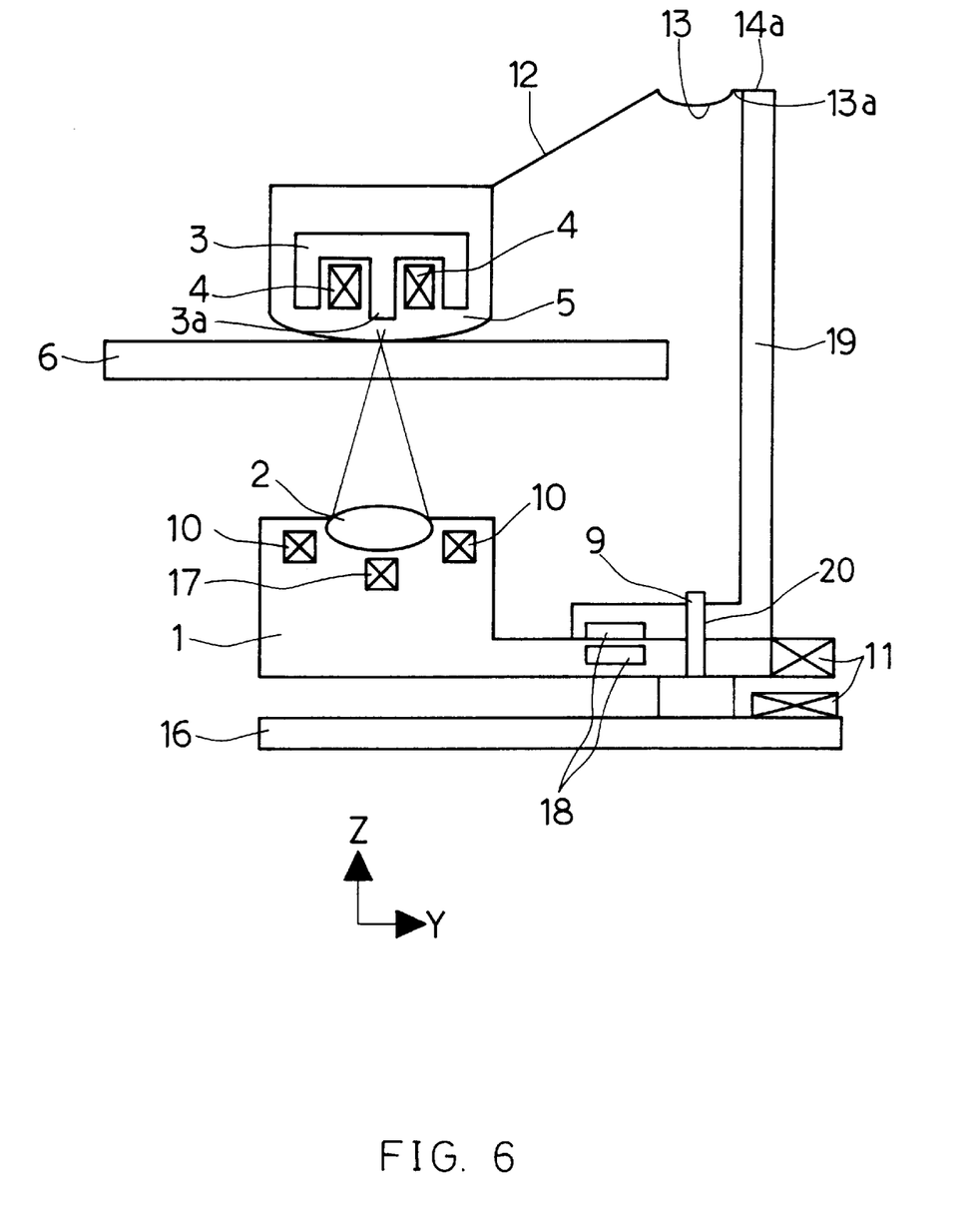
FIG. 6 is a side view showing a schematic view of a magneto-optical head according to Embodiment 4 of the present invention.
Figure 7:
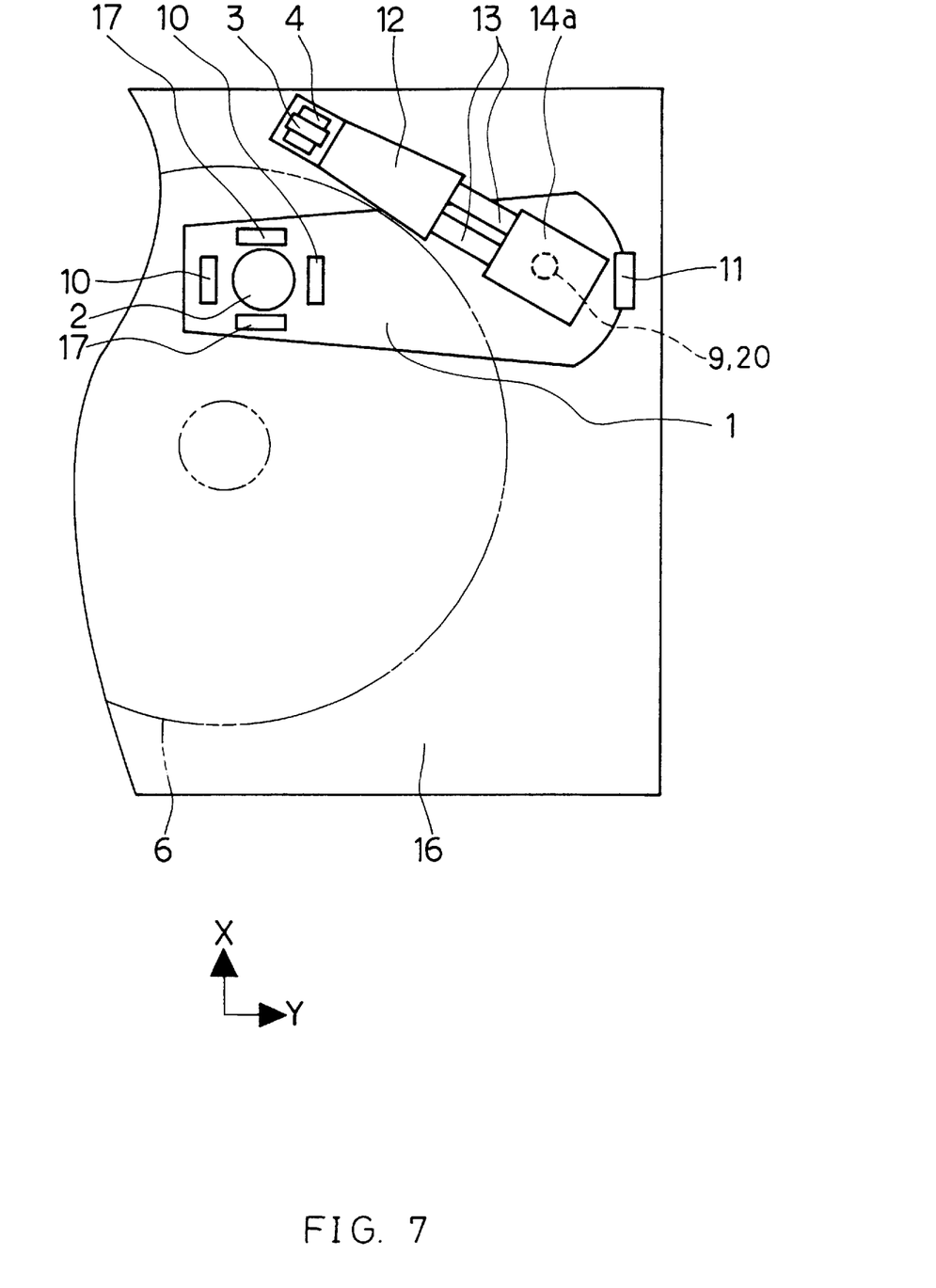
FIG. 7 is a top view showing a schematic view of a magneto-optical head according to Embodiment 4 of the present invention.

FIG. 6 is a side view of a magneto-optical head according to Embodiment 4 of the present invention. FIG. 7 is a top view of a magneto-optical head according to Embodiment 4 of the present invention in a reproducing condition.

The constructional elements having the same function as in the prior art shown in FIGS. 8, 9, 10, and 11 are indicated with the same reference characters.

In FIGS. 6 and 7, a clutch 18 is formed of, for example, an electromagnet in which a coil is wound around an iron core and a ferromagnetic piece. The electromagnet is located at the side of an optical head 1. The ferromagnetic piece is arranged opposing the electromagnet at the side of a joint member 19. The joint member 19 has a rotation hole 20 at a part where the optical head 1 and the joint member 19 are connected. A rotation axis 9 is inserted into the rotation hole 20 of the joint member 19. Thus, a magnetic head 12 is connected to the optical head 1 and can rotate independently from the optical head 1 in a plane parallel to the magneto-optical disk 6.

The example shown in FIGS. 6 and 7 differs from the prior art shown in FIGS. 8, 9, 10, and 11 and the examples shown in FIGS. 1 to 5 in the following point. The rotation hole 20 and the clutch 18 are provided in the joint member 19 for connecting the magnetic head 12 and the optical head 1. By electrifying the clutch 18 when recording data, the optical head 1 and the magnetic head 12 move together in the radial direction of the magneto-optical disk. In reproducing data, by stopping the electrification to the clutch 18, the magnetic head 12 is separated from the optical head 1 by being rotated. Thus, only the optical head 1 can move in the radial direction of the magneto-optical disk 6. In reproducing data, it is preferable that a lever or the like (not shown in the figure) provided to the base 16 moves the magnetic head 12 separated by being rotated to the outside of the magneto-optical disk 6 as shown in FIG. 7 and fixes the magnetic head 12 there.

The method of positioning the optical head 1 and the magnetic head 12 is the same as in the prior art. Therefore, the explanation of the method is omitted here.

As described above, in the magneto-optical head according to the present embodiment, the clutch and the rotation mechanism are provided at the part connecting the optical head and the magnetic head, and the optical head and the magnetic head are separated when reproducing data. Thus, in addition to the effects in Embodiments 1, 2, and 3, not only high speed access can be realized when reproducing data, but also the electricity used for tracking control and access control can be reduced.

Further, in the present embodiment, an optical block may be separated from the optical head and a mirror may be provided at the rotation center of the magneto-optical head as in Embodiment 3. In this case, the optical head can be lightened. Therefore, the higher speed access can be realized in reproducing data and the electricity used for tracking control and access control can be further reduced.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magneto-optical head comprising:

an optical head comprising light-focusing means for focusing a beam spot on an information-recording medium; and a magnetic head comprising magnetic-field applying means for applying a magnetic field to the information-recording medium, wherein the optical head and the magnetic head have the same rotation center and are arranged to rotate together in respective planes parallel to the information-recording medium.

2. The magneto-optical head according to claim 1, wherein the optical head and the magnetic head are arranged so as opposite each other and sandwich the information-recording medium.

3. The magneto-optical head according to claim 1, wherein the light-focusing means and the magnetic head follow a primary component of eccentricity of the information-recording medium together during rotation of the information-recording medium.

4. The magneto-optical head according to claim 1, further comprising:

a high-frequency tracking drive for driving the light-focusing means relative to the optical head in a plane parallel to the information-recording medium.

5. The magneto-optical head according to claim 1, further comprising:

an optical block separated from the optical head comprising a light-emitting means and a light-receiving means.

6. The magneto-optical head according to claim 5, further comprising:

a mirror for refracting an optical beam emitted from the optical block to the optical head.

7. The magneto-optical head according to claim 6, wherein rotation of the mirror is synchronized with that of the optical head and the mirror rotates for an angle half a rotation angle of the optical head.

8. The magneto-optical head according to claim 7, wherein the mirror and the optical head rotate coaxially.

9. A magneto-optical head comprising:

an optical head comprising a light-focusing means for focusing a beam spot on an information-recording medium;

an optical block separated from the optical head and comprising light-emitting means and light- receiving means;

a high-frequency tracking drive for driving the light-focusing means in a plane parallel to the information-recording medium relative to the optical head;

a mirror refracting an optical beam emitted from the optical block; and a magnetic head comprising magnetic-field applying means for applying a magnetic field to the information-recording medium, wherein the optical head, the magnetic head, and the mirror have the same rotation center, and the optical head and the magnetic head are arranged to rotate together in respective planes parallel to the information-recording medium.

10. The magneto-optical head according to claim 1 or 9, further comprising:

a system for separating the optical head and the magnetic head.

11. The magneto-optical head according to claim 10, wherein the optical head and the magnetic head are separated when reproducing data from the information-recording medium.

12. The magneto-optical head according to claim 10, wherein the separating system comprises a clutch and mechanically separates and connects the optical head and the magnetic head.

13. The magneto-optical head according to claim 10, further comprising:
a fixing system for fixing the magnetic head relative to a center of rotation when reproducing data from the information-recording medium.

14. The magneto-optical head according to claim 10, wherein the optical head and the magnetic head are joined via a rotating system.

* * * * *